Dec. 11, 1951  W. E. McCORMICK  2,577,790
POSITIVE-LOCKING HOOK
Filed June 28, 1946

INVENTOR.
WILLIAM E. McCORMICK
BY
M.C. Hayes
ATTORNEY

Patented Dec. 11, 1951

2,577,790

UNITED STATES PATENT OFFICE 2,577,790

POSITIVE-LOCKING HOOK

William E. McCormick, United States Navy

Application June 28, 1946, Serial No. 680,103

4 Claims. (Cl. 24—241)

(Granted under the act of March 3, 1883, as amended April 30, 1928; 370 O. G. 757)

The invention described herein may be manufactured and used by or for the Government of the United States of America for governmental purposes without the payment of any royalties thereon or therefor.

This invention relates in general to a hook and in particular to a positive-locking hook.

It is an object of this invention to provide a hook which closes when it engages an object by the act of engagement, and thereby locks the object in the hook.

It is a further object to provide a sensitive means for tripping a positive-locking device in a hook when the hook engages an object.

It is a still further object to provide a boat hook that will enable a boat to be moored to a buoy temporarily without necessitating men to handle lines directly to the buoy.

Figure 1:
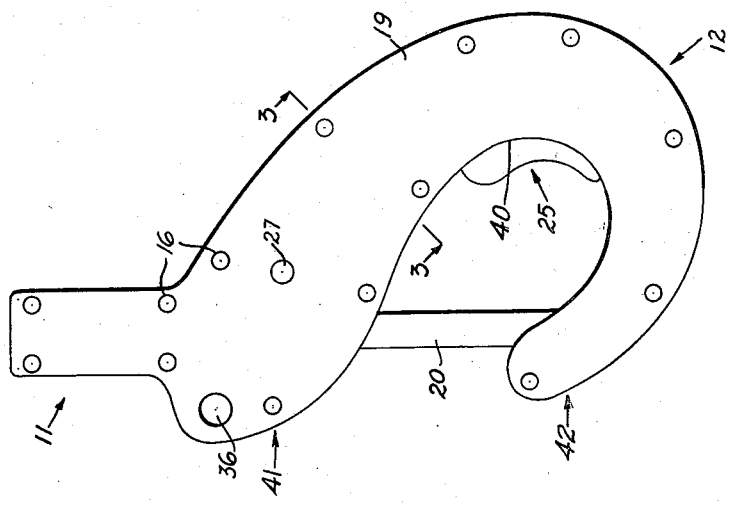
Figure 2:
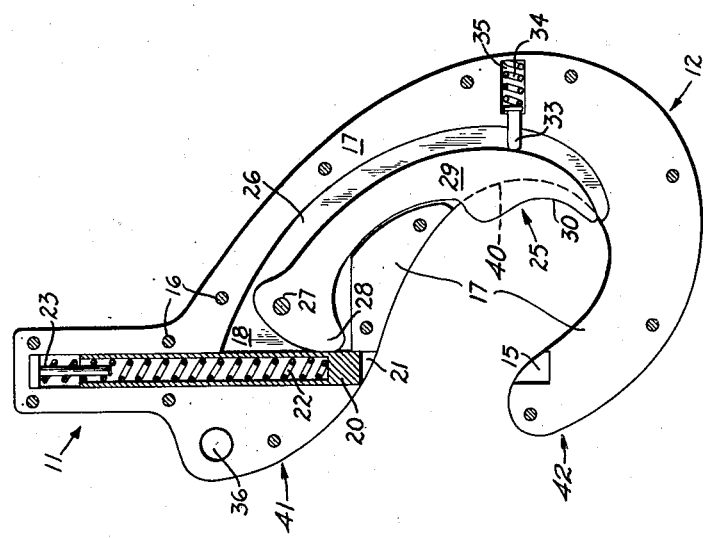
Figure 3:
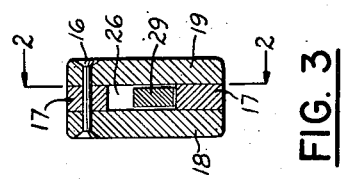

Further objects and advantages of this invention, as well as its construction, arrangement and operation, will be apparent from the following description and claims in connection with the accompanying drawings, in which, Fig. 1 is an elevation of a hook construction that embodies the invention, the hook being shown in closed condition, Fig. 2 is a cross-sectioned elevation of the hook construction of Fig. 1, the view being taken on line 2—2 of Fig. 3 with the detent shown in cross-section on its longitudinal center plane, and showing the hook in open condition, and Fig. 3 is a cross-sectional elevation, taken on line 3—3 of Fig. 1.

The hook structure of the disclosure comprises a concave curved surface 40 forming a bay, and extensions curving oppositely away to comprise a handling end 41 and a terminal end 42 which are disposed opposite each other with a gap between them. In the preferred construction shown, the terminal end 42 projects towards the oppositely disposed handling end 41. The stem 11 may be provided to attach a handle, not shown, to the hook 12, and the stem 11 is preferably constructed integral with the hook structure to project from the handling end 41 in a direction away from the hook end 42.

Under the preferred embodiment shown, the hook construction consists of three laminae or layers, disposed face to face and held together by rivets 16. The inner or core lamina 17 includes cutouts as shown in Fig. 2 to form certain cavities within the construction that contain operating mechanism, as will be described more fully hereinafter. The outer layers or laminae 18 and 19 form a covering for the working mechanism contained in the cavities formed by the cutout portions of the core lamina 17.

A movable detent or pin 20 is housed in the cavity 21, formed by a cutout of core lamina 17, the detent 20 of the disclosed embodiment being in the handling end 41 and being directed towards the oppositely disposed terminal end 42. The spring 22 is housed with the detent 20 in backing engagement therewith. Abutment pin 23 is lodged at the base of cavity 21, and provides a seat and a guide for the spring 22. The spring 22 is tensioned to actuate the detent 20, under guidance of the cavity 21, towards and into engagement with the oppositely disposed terminal end 42 of hook 12. The housing 21 for the detent 20 with its spring 22 is extended into the stem 11 of the disclosed embodiment.

The recess 15 is provided in the terminal end 42, by means of a cutout of the core lamina 17, the recess 15 being positioned in the path of the detent 20 travelling under actuation by its spring 22. When the detent 22 engages the terminal end 42 of the hook 12, its end seats in the recess 15 and is held thereby, thus closing the hook securely.

A detent control, generally indicated at 25, is housed in the structure of hook 12, in the cavity 26 formed by a cutout of core lamina 17. The detent control 25, comprises the gripper 28 that engages and holds the detent 20. The gripper 28 is secured to the abutment or actuating finger 30 to be actuated thereby. The abutment finger 30 extends from the gripper 28 and is connected therewith through the arm 29. The gripper 28, arm 29 and finger 30 thus constituting a lever which is pivoted on the pin 27. The abutment finger 30 projects exteriorly of the structure of the hook 12 and into the bay formed by the concave curved surface 40.

Abutment pin 33 is backed by the spring 34 which is housed in the cavity 35 formed by a cutout of lamina 17. The spring 34 is tensioned to actuate the gripper 28 into engagement with the detent 20, the abutment finger 30 simultaneously being projected exteriorly of the hook structure in the direction away from the curved surface 40 of the bay formed thereby. Thus, the gripper 28 under tension of its spring 34 holds the detent 20 at any position in cavity 21 that it occupies. When the detent 20 occupies the position in Fig. 2, and is held there by the gripper 28, the hook 12 is in open condition. The detent 20 is released from being engaged by the gripper 28 when an object in the bay of hook 12 presses against the abutment finger 30 and actuates it towards the surface 40 opposed to tension of the spring 34. The detent 20 is thereby free to move under action of its spring 22, and the detent 20 moves into engagement with the recess 15 and occupies the position shown in Fig. 1.

To operate the hook, it is first set or cocked for use. The abutment finger 30 is pressed manually opposed to the tension of the gripper spring 34, and this actuates the gripper 28 out of engagement with the detent 20. The detent 20 is now pressed manually into the cavity 21 opposed to the tension of its spring 22, and the detent is held in cavity 21 manually until the abutment finger 30 is released. When the gripper finger 30 is released, the spring 34 actuates the gripper 28 and presses it into engagement with the detent 20 to hold it. The detent 20 is thus held housed in its cavity as seen in Fig. 2, and the hook 12 is set ready to be used.

When the hook engages something, for example a mooring eye of a buoy, the object that enters the bay of the hook 12 presses the abutment finger 30 towards the surface 40, and the gripper 28 is thereby actuated opposed to tension of the spring 34 out of engagement with the detent 20. The detent 20 is thus released for the spring 22 to actuate the detent towards the terminal end 42 and into engagement with the recess 15. The position of detent 20 is then as seen in Fig. 1. The hook 12 is thereby secured to the object that is caught in it.

To release the hook 12 from the object it engages, the detent 20 is pressed into its cavity 21 manually, the abutment finger 30 being first pressed manually to actuate the gripper 28 out of engagement with the detent.

The hook 12 is adapted to be secured to a handle, which may be attached to the stem 11 in any suitable manner.

A hole 36 is provided so that a line (not shown) may be attached to the hook construction in order to provide a means of contact with the hook 12 at all times. This is especially advantageous in cases such as picking up a mooring line that is attached to a buoy, releasing the handle and at the same time being moored to the buoy by means of the line attached to the hook.

The scope of the invention is not limited to the specific embodiment of the disclosure.

What is claimed is:

1. In structure of a hook having a concave surface forming a bay and extensions curving oppositely away to comprise ends opposite each other with a gap between them, a detent housed in the structure at one of the ends of the hook and being directed towards the oppositely disposed end, a spring for the detent housed therewith and tensioned to actuate the detent towards and into engagement with the oppositely disposed hook end, detent control mechanism housed in the structure and comprising a gripper for the detent, a spring for the gripper and an actuating finger extending from the gripper and projecting out of the structure into the bay to a position away from the concave surface of the bay, the gripper being movable alternatively out of engagement with the detent and into engagement therewith to hold the detent against actuation by the detent spring, the gripper spring being tensioned to actuate the gripper into holding engagement with the detent and simultaneously move the abutment finger away from the concave surface of the bay, actuation of the abutment finger towards the concave surface by an object in the bay of the hook being opposed to the gripper spring and operating to move the gripper out of engagement with the detent to release the detent for its actuation by its spring.

2. In a hook structure as defined in claim 1, a recess in the end of the hook opposite the detent and positioned in the path of the detent to engage the end thereof.

3. In a hook structure as defined in claim 1, a stem projecting from the detent end of the hook in a direction away from the opposite end, the housing of the detent and its spring being extended into the stem.

4. The hook structure defined in claim 1 being laminated and comprising a core lamina and face laminae secured to the opposite faces of the core lamina, cavities of housings in the structure being formed by cutouts of the core lamina.

WILLIAM E. McCORMICK.

REFERENCES CITED

The following references are of record in the file of this patent:

UNITED STATES PATENTS

| Number | Name | Date |
|---|---|---|
| 327,008 | Miller | Sept. 29, 1885 |
| 365,568 | Betz | June 28, 1887 |
| 398,599 | Fessenden | Feb. 26, 1889 |
| 607,844 | Francisco et al. | July 26, 1898 |
| 741,014 | Covert | Oct. 13, 1903 |

FOREIGN PATENTS

| Number | Country | Date |
|---|---|---|
| 590,812 | Great Britain | July 29, 1947 |